US010729155B2

(12) United States Patent
Cox et al.

(10) Patent No.: US 10,729,155 B2
(45) Date of Patent: Aug. 4, 2020

(54) METHOD FOR MANUFACTURING A FROZEN CONFECTION

(71) Applicant: Conopco, Inc., Englewood Cliffs, NJ (US)

(72) Inventors: Andrew Richard Cox, Bedford (GB); Peter Conrad Schuetz, Bedford (GB); Scott Singleton, Carlton (GB)

(73) Assignee: Conopco, Inc., Englewood Cliffs, NJ (US)

( * ) Notice: Subject to any disclaimer, the term of this patent is extended or adjusted under 35 U.S.C. 154(b) by 223 days.

(21) Appl. No.: 15/308,256

(22) PCT Filed: Apr. 8, 2015

(86) PCT No.: PCT/EP2015/057618
§ 371 (c)(1),
(2) Date: Nov. 1, 2016

(87) PCT Pub. No.: WO2015/169522
PCT Pub. Date: Nov. 12, 2015

(65) Prior Publication Data
US 2017/0079307 A1 Mar. 23, 2017

(30) Foreign Application Priority Data
May 8, 2014 (EP) ...................... 14167530

(51) Int. Cl.
*A23G 9/42* (2006.01)
*A23G 9/34* (2006.01)
*A23G 9/46* (2006.01)

(52) U.S. Cl.
CPC ............... *A23G 9/42* (2013.01); *A23G 9/34* (2013.01); *A23G 9/46* (2013.01); *A23V 2002/00* (2013.01)

(58) Field of Classification Search
CPC .............. A23G 9/42; A23G 9/34; A23G 9/46
USPC ................................ 426/100, 565
See application file for complete search history.

(56) References Cited

U.S. PATENT DOCUMENTS

| 4,031,262 | A | 6/1977 | Nakayama | |
|---|---|---|---|---|
| 5,175,013 | A * | 12/1992 | Huang | A23G 9/20 426/565 |
| 5,423,996 | A | 6/1995 | Salyer | |
| 5,738,889 | A | 4/1998 | Bee | |
| 6,423,359 | B1 | 7/2002 | Braverman | |
| 2003/0031768 | A1 | 2/2003 | Dalziel et al. | |
| 2007/0134404 | A1 | 6/2007 | Lacy et al. | |
| 2007/0196538 | A1 | 8/2007 | Aldred et al. | |
| 2011/0027427 | A1 | 2/2011 | Panyam et al. | |
| 2011/0183039 | A1 | 7/2011 | Burns et al. | |
| 2011/0300264 | A1 | 12/2011 | Neta et al. | |
| 2012/0196006 | A1 | 8/2012 | Jones | |
| 2012/0328743 | A1 | 12/2012 | Head et al. | |
| 2013/0045322 | A1 * | 2/2013 | Wubbolts | A23D 9/00 426/606 |
| 2013/0095223 | A1 * | 4/2013 | Nayini | A23L 3/375 426/565 |

FOREIGN PATENT DOCUMENTS

| EP | 0390947 | 10/1990 |
|---|---|---|
| EP | 1051913 | 11/2000 |

(Continued)

OTHER PUBLICATIONS

Lycopodium powder, obtained from www. gora.hu/lycopodium. html Apr. 19, 2014, 1 page, Date verified by www.archive.org (Year: 2014).*

(Continued)

*Primary Examiner* — Jyoti Chawla
(74) *Attorney, Agent, or Firm* — Gerard J. McGowan, Jr.

(57) ABSTRACT

Ice particles are known to sinter over time. However the inventors have observed that ice particles coated with hydrophobic particles are storage stable. Thus a method of manufacturing a frozen confection comprising as ingredients: (a) 40 to 85, preferably 55 to 75 w/w water in liquid and frozen forms; (b) 0 to 30, preferably 0.2 to 20, more preferably 0.3 to 16% w/w first fat; (c) 5 to 45, preferably 10 to 40, more preferably 12 to 35% w/w freezing point depressant; (d) 0 to 7, preferably 0.3 to 6, more preferably 0.5 to 5% w/w aerating agent; and (e) 0.5 to 10, preferably 1 to 8, more preferably 2 to 5% w/w stabilising particles, wherein the frozen confection has an overrun of at least 10, preferably at least 15, most preferably at least 30% v/v when comprising aerating agent, wherein the surface of the stabilising particles is hydrophobic, the method comprising the steps of: (a) Providing ice and/or frozen fruit and/or frozen vegetable particles at least partially coated with the stabilising particles; (b) Providing one or more non-frozen concentrate components comprising any remaining ingredients, wherein one or more of the concentrate components is optionally aerated, wherein the temperature of the one or more concentrate components is independently no higher than 10, preferably 5 degrees centigrade; (c) Mixing the ice and/or frozen fruit and/or frozen vegetable particles provided in step (a) with the one or more of the non-frozen concentrate components provided in step (b); (d) Optionally hardening the mixture of step (c) by cooling it to a temperature of −15 to −25 degrees centigrade; thereby to form the frozen confection, wherein the ice and/or frozen fruit and/or frozen vegetable particles are selected from the group consisting of: (a) A size distribution of number average length 1-500, preferably 5-200, most preferably 0-100 microns; (b) A size distribution of number average length 100-3000, preferably 250-3000, most preferably 500-3000 microns; (c) A size distribution with a number average length of a first population 500-5000, preferably 750-5000, most preferably 1000-5000 microns, and (d) A size distribution of the combination of the distributions of (a) and (c).

8 Claims, No Drawings

(56) References Cited

FOREIGN PATENT DOCUMENTS

| | | |
|---|---|---|
| EP | 1602283 | 7/2005 |
| EP | 1651338 | 5/2006 |
| EP | 2589297 | 5/2013 |
| GB | 1327511 | 8/1973 |
| JP | 61139342 | 6/1986 |
| WO | WO9634537 | 11/1996 |
| WO | WO9716980 | 5/1997 |
| WO | WO0053029 | 9/2000 |
| WO | WO02102167 | 12/2002 |
| WO | WO2005014158 | 2/2005 |
| WO | WO2005046346 | 5/2005 |
| WO | WO2005071053 | 8/2005 |
| WO | WO2006007921 | 1/2006 |
| WO | WO2009124823 | 10/2009 |
| WO | WO2010069746 | 6/2010 |
| WO | WO2010069750 | 6/2010 |
| WO | WO2010069752 | 6/2010 |
| WO | WO2011051061 | 5/2011 |
| WO | WO2011160921 | 12/2011 |
| WO | WO2013092510 | 6/2013 |

OTHER PUBLICATIONS

B.P. Binks et al., Naturally Occurring Spore Particles at Planar Fluid Interfaces and in Emulsions, Langmuir, 2005, pp. 8161-8167; XP002731203Retrieved from the Internet:URL:http://pubs.acs.org/doi/pdf/10.1021/la0513858 [retrieved on Oct. 16, 2014], vol. 21.

Carter et al, Gas Storage in "Dry Water" and "Dry Gel" Clathrates, Langmuir, Oct. 20, 2009, 3186-3193, 26(5), GB.

Experimental and Analytical Facilities, Delft University of Technology, Dec. 16, 2005, pp. 41-51.

Hashmi et al, Freezing of a Liquid Marble, Langmuir, Jul. 2, 2012, 10324-10328, 28, US.

IPRP in PCTEP2015057618, dated Jul. 26, 2016.

Lycopodium Powder, Wikipedia, 2016, PP1-2https://en.wikipedia.org/wiki/Lycopodium_powderretrieved on Jul. 27, 2016.

Margarines and Shortenings, Ullmanns Encyclopedia of Industrial Chemistry, 1990, pp. 156-158, vol. A16.

Micro Titanium Dioxide, Tayca Corporation, Copyright 2009, pp. 1-2.

P. Munuklu et al., Particle formation of edible fats using the supercritical melt micronization process (ScMM), The of Supercritical Fluids, 2007, pp. 181-190, vol. 43, Elsevier Journal.

Search Report EP14167530, dated Oct. 16, 2014.

Search Report in PCTEP2015057618, dated Nov. 2, 2015.

Van Den Enden et al., A Method for the Determination of the Solid Phase Content of Fats Using Pulse Nuclear Magnetic Resonance, Fette Seifen Anstrichmittel, 1978, pp. 180-186, vol. 80.

Windhab et al, The production of ice powder: new types of dessert products, European Dairy Magazine, Feb. 16-18, 1999, CH.

Written Opinion 1 in PCTEP2015057618, dated Mar. 3, 2016.

Written Opinion in EP14167530, dated Oct. 16, 2014.

Written Opinion in PCTEP2015057618, dated Nov. 2, 2015.

Murray et al., "Particles as Emulsifiers of Water-In-Water Biopolymer Emulsions", Engineering and Physical Sciences Research Council proposal, pp. 1-8, Sep. 9, 2013.

\* cited by examiner

METHOD FOR MANUFACTURING A FROZEN CONFECTION

The invention relates to a method of manufacturing a frozen confection comprising ice and/or frozen fruit and/or frozen vegetable particles, and the frozen confection produced therefrom.

U.S. Pat. No. 5,423,996 (Phase Change Laboratories Incorporated) discloses a composition for thermal energy storage or thermal energy generation comprising a silica based gel or dry powder in the form of silica particles containing a water/urea phase change material for thermal energy storage. The water/urea phase change material, which is a clathrate or inclusion compound, stores and releases at least 50 cal/gm of thermal energy in freezing and melting, and has a melting and a freezing point in the range of −11 to −15 degrees centigrade. The thermal energy storage composition may find use in a variety of applications including medical wraps, food serving ware, and "blue ice" for cold packs or food storage. Examples 2 and 4 mention using hydrophilic silica (Cabot MS-7 and PPG Silica ABS respectively), whereas Example 3 mentions PPG BXS 318 hydrophobic silica.

Carter et al. (Langmuir, 26, 5, 3186-3193 (2010)) describes a study on gas storage in dry water, which is a free-flowing powder prepared by mixing water, hydrophobic silica particles, and air at high speeds. It is explained that dry water is effectively a water-in-air emulsion (more correctly an inverse foam) consisting of water droplets surrounded by a network of hydrophobic fumed silica nanoparticles which prevent droplet coalescence. After preparation, dry water is a stable free-flowing powder which can be readily handled under ambient conditions. The water domains are of the order of 50 microns, meaning that diffusion of gas into the clathrate structure is significantly enhanced compared to bulk water or ice. The preparation method is also much more facile and scalable than, for example, grinding and size-selective sieving of ice particles. In the Example, 95 ml of deionised water and 5 g of Wacker Chemie HDK grade H18 hydrophobic silica nanoparticles (primary particle size was 5-30 nm with aggregates of 100-1000 nm), prepared by pretreatment of silica particles with dichlorodimethylsilane, were blended in three 30 second bursts at 19 000 rpm. Data is presented of methane gas uptake in dry water at different temperatures ranging from 263 to 279 K. A methane gas hydrate formation temperature of 273 K was found to be optimal.

Hashmi et al. (Langmuir, 28, 10324-10328 (2010)) describes a study on the freezing of a liquid marble which comprise a liquid-filled core enveloped by micrometrically or nanometrically scaled particles. These particles can be hydrophobic or hydrophilic. In the Example, the liquid marbles are prepared by rolling water droplets on 28+/−5 micron lycopodium particles. The marbles are then frozen on a silicon wafer at −8 degrees centigrade whereupon they acquire a flying saucer shaped morphology.

US 2012/0196006 (Jones) discloses a method and apparatus for coating cryogenically frozen particles, such as food particles, with a powder at least in part by random contact with the powder while the particles and powder are circulating in a liquid cryogen. Ice cream products are known to be popular, and some products on the market combine ice cream shapes with various types of coatings. By adding coatings to ice cream, the number of different products and flavours that are possible may be greatly increased. However, it is often difficult and challenging to uniformly apply coatings to frozen food products, such as solid or semi-solid ice cream, at cold temperatures. This can result in coated products that are unappealing in taste, texture and/or appearance. The invention relates to a method for powder coating a food particle, comprising: (a) adding a plurality of pieces or droplets of a food mixture into a liquid cryogen bath in a container to form a plurality of cryogenically frozen food particles; and (b) coating the plurality of cryogenically frozen food particles with a powder present in the liquid cryogen. The food mixture can be a liquid formulation of ice cream and the plurality of cryogenically frozen food particles are beaded ice cream. The powder can be maltodextrin or cocoa powder.

US 2012/0328743 (Head et al.) discloses a composition comprising a powder coated particulate ice cream product, wherein the particulate ice cream product is cryogenically formed. The particulate ice cream product may further comprise a plurality of coatings including one or more powder coatings. The present invention further relates to methods for coating these cryogenically frozen ice cream particles. There is a market for ice cream products having an increased variety of flavours. There is also a need for decreasing the stickiness or adhesion of ice cream shapes. The need for these improvements is especially great with regards to particulate ice cream food products formed using cryogenically cooled equipment. These particulate ice cream food products may comprise formulations of frozen confections, such as ice cream, ice milk, flavoured ices, sorbet, frozen yogurt, etc., in the form of small particulate shapes.

WO 2013/092510 (Nestec SA) relates to frozen confections, such as ice creams, in particular to a shelf-stable composition for the preparation of homemade frozen confections. It has been more and more popular to produce ice cream and other frozen confections at home. Some powders are available on the market to prepare frozen confections at home. However according to this document, all of these frozen confection powders currently being on the market contain emulsifiers and/or stabilizers. There is therefore a need for a ready-to-use shelf-stable composition for preparing frozen confections at home which is devoid of stabilizers, emulsifiers and egg yolk and which is ready for quick preparation followed by immediate consumption. The invention described in this document provides a shelf-stable composition for preparing frozen confections where all components are pre-blended. The product obtained starting from this composition and mixing it with ice and an edible liquid e.g. in a blender has a pleasant whipped texture and a refreshing creamy taste, where the nutrient and caloric value can easily be customized to the customer's wishes, since no addition of fat, such as vegetable fat, is present. It is necessary to use a dairy fat as fat source, since any conventional vegetable fat used will produce a product where fat is crystallized, because there are no emulsifiers in the composition to emulsify fat and water. The frozen confection may be selected from the group consisting of ice cream, low fat ice cream, milk ice, sherbet, frozen yoghurt, smoothies and slush beverage. Examples of "ice" includes but are not limited to frozen water (pure ice), frozen juice, such as fruit juice or vegetable juice, frozen milk, or ice milk, frozen 10 chocolate pieces, or frozen fruits and frozen berries or combinations thereof. The term "edible liquid" means any liquid which is edible and which is suitable for being present in a frozen confection, and in one embodiment of the frozen confection the edible liquid is selected form the group of milk, yoghurt, water or juice.

EP 1 602283 A1 (Nestec SA) provides details of traditional frozen confection manufacture.

For manufacturing products, the ingredients entering into the composition of a frozen confection may be dispersed at around approximately 60 to 70° C. for approximately 15 to 30 min., for example. The whole may be heated and homogenized at around 70 to 75° C., for example, at a pressure of the order of 140 to 220 bar, for example. These steps of dispersion, heating and homogenisation make it possible to bring about hydration of the stabilizer. The mixture may then be pasteurized according to methods known to persons skilled in the art, for example at around 80 to 90° C. for 10 to 30 s. The homogenisation-heating step may be carried out at a pasteurization temperature which brings about, on its own, pasteurization of the mixture. The mixture may then be cooled to around 2 to 8° C. by known means. This mixture may then be aged or otherwise for 4 to 24 h at around 2 to 6° C., for example, with or without stirring. After this aging step, the mixture may be frozen at around −3 to −8° C., and preferably at about −4.5 to −7.5° C. with stirring with injection of gas so as to produce a degree of overrun of the order of 30 to 150%, for example. After the aging step, the frozen compositions may, for example, be extruded in the form of bars having a greater or lesser degree of overrun, with the aid of an ice-cream industry refrigerated scraped surface heat exchanger or freezer with injection of gas. The aerated semi-frozen composition coming out of the freezer may also be filled into containers or moulds under pressure using a bottom-up filler, for example. The mixture obtained may then be hardened by freezing at around −20 to −40° C., for example.

It is therefore apparent that traditional frozen confection manufacture requires the ability to mix, heat, homogenise, pasteurize, cool, age, freeze, aerate, and then harden the product. Such traditional frozen confection manufacture therefore has several disadvantages such as cost of equipment and the need for large factories in which the frozen confection are made. Furthermore, extensive and robust frozen food supply chains are required in order to transport the product from the factory to the point of sale. There is also a lack of flexibility in what can be manufactured because the factories typically make only one type of frozen confection on each piece of equipment and any flavour variations require the equipment to be shut down, completely cleaned and restarted with the new flavour.

There is therefore a need to improve traditional frozen confection manufacture, in particular the step at which the ingredients are frozen due to the extensive energy requirements needed for cooling the mix to temperatures at which ice can form.

SUMMARY OF THE INVENTION

The present invention has now found a new process by which frozen confections may be manufactured which overcomes the above disadvantages. In particular, the invention has found that frozen particles can be employed to remove the processing step at which the ingredients are frozen provided that the frozen particles are at least partially coated with a specific coating.

Thus in a first aspect of the invention, a method of manufacturing a frozen confection is provided, the frozen confection comprising as ingredients:
 (a) 40 to 85, preferably 55 to 75% w/w water in liquid and frozen forms;
 (b) 0 to 30, preferably 0.2 to 20, more preferably 0.3 to 16% w/w first fat;
 (c) 5 to 45, preferably 10 to 40, more preferably 12 to 35% w/w freezing point depressant;
 (d) 0 to 7, preferably 0.3 to 6, more preferably 0.5 to 5% w/w aerating agent; and
 (e) 0.5 to 10, preferably 1 to 8, more preferably 2 to 5% w/w stabilising particles,
 wherein the frozen confection has an overrun of at least 10, preferably at least 15, most preferably at least 30% v/v when comprising aerating agent,
 wherein the surface of the stabilising particles is hydrophobic,
 the method comprising the steps of:
 (a) Providing ice and/or frozen fruit and/or frozen vegetable particles at least partially coated with the stabilising particles;
 (b) Providing one or more non-frozen concentrate components comprising any remaining ingredients, wherein one or more of the concentrate components is optionally aerated, wherein the temperature of the one or more concentrate components is independently no higher than 10, preferably 5 degrees centigrade;
 (c) Mixing the ice and/or frozen fruit and/or frozen vegetable particles provided in step (a) with the one or more of the non-frozen concentrate components provided in step (b);
 (d) Optionally hardening the mixture of step (c) by cooling it to a temperature of −15 to −25 degrees centigrade;
 thereby to form the frozen confection,
 wherein the ice and/or frozen fruit and/or frozen vegetable particles are selected from the group consisting of:
 (a) A size distribution of number average length 1-500, preferably 5-200, most preferably 10-100 microns;
 (b) A size distribution of number average length 100-3000, preferably 250-3000, most preferably 500-3000 microns;
 (c) A size distribution with a number average length 500-5000, preferably 750-5000, most preferably 1000-5000 microns, and
 (d) A size distribution of the combination of the distributions of (a) and (c).

One advantage of the claimed method is that frozen confections can be produce nearer the point of sale in local small scale factories or point of sale kiosks/outlets because of the ease of transport afforded by the product of step (a), i.e. the ice and/or frozen fruit and/or frozen vegetable particles at least partially coated with the stabilising particles.

Furthermore as the product of step (a) is not in equilibrium with a non-frozen matrix phase, the product can be transported in the cold chain at a much higher temperature than the customary temperature for the cold chain of −18 degrees centigrade, significantly reducing energy requirements.

One further advantage of the claimed method is the manufacturing flexibility the method brings as the product of step (a) can be easily combined with the remaining ingredients in the method by simple mixing thereby to provide the desired frozen confection. The claimed method is flexible enough to be able to provide a range of frozen confections such as ice cream, slushes, a Café Zero™ style product, sorbet, etc.

In a further aspect of the invention, a frozen confection produced according to the method of the first aspect of the invention is provided.

In another aspect of the invention, a frozen confection comprising ice and/or frozen fruit and/or frozen vegetable particles at least partially coated with the stabilising particles is provided.

In a final aspect of the invention, a kit for producing a frozen confection according to the second aspect of the invention is provided, the kit comprising:
(a) Ice and/or frozen fruit and/or frozen vegetable particles at least partially coated with stabilising particles; and
(b) One or more non-frozen concentrate components comprising any remaining ingredients, wherein one or more of the concentrate components is optionally aerated, wherein the temperature of the one or more concentrate components is independently no higher than 10, preferably 5 degrees centigrade.

DETAILED DESCRIPTION OF THE INVENTION

The term "overrun" is defined as by the equation below and is measured at atmospheric pressure:

$$\% \text{ over run} = \frac{\left(\begin{array}{c}\text{Volume of frozen confection}-\\ \text{Volume deaerated frozen confection}\end{array}\right)}{\text{Volume of deaerated frozen confection}}$$

The term "mouth feel" means the tactile sensation that frozen confection of the second aspect of the invention imparts during all stages of consumption which consists of biting a piece of the said frozen confection, and then swirling the piece in the oral cavity before swallowing.

The term "length" when used in connection with an ice or frozen fruit or frozen vegetable particle is defined as the longest distance on a straight line between any two points on the same particle as can be determined based on a cryo-scanning electron micrograph.

The term "frozen confection" means a sweet-tasting fabricated foodstuff intended for consumption in the frozen state (i.e. under conditions wherein the temperature of the foodstuff is less than 0° C., and preferably under conditions wherein the foodstuff comprises significant amounts of ice). Frozen confections include ice cream, sorbet, sherbet, frozen yoghurt, water ice, milk ice and the like. Preferably the frozen confection has a total solids content (i.e. the sum of the weights of all the ingredients other than water, expressed as a percentage of the total weight) of at least 20%, more preferably at least 25%. Frozen confections may be aerated or unaerated.

The solid fat content in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

In a first aspect of the invention a method of manufacturing a frozen confection is provided, the frozen confection comprising as ingredients:
(a) 40 to 85, preferably 55 to 75% w/w water in liquid and frozen forms;
(b) 0 to 30, preferably 0.2 to 20, more preferably 0.3 to 16% w/w first fat;
(c) 5 to 45, preferably 10 to 40, more preferably 12 to 35% w/w freezing point depressant;
(d) 0 to 7, preferably 0.3 to 6, more preferably 0.5 to 5% w/w aerating agent; and
(e) 0.5 to 10, preferably 1 to 8, more preferably 2 to 5% w/w stabilising particles,
wherein the frozen confection has an overrun of at least 10, preferably at least 15, most preferably at least 30% v/v when comprising aerating agent,
wherein the surface of the stabilising particles is hydrophobic, the method comprising the steps of:
(a) Providing ice and/or frozen fruit and/or frozen vegetable particles at least partially coated with the stabilising particles;
(b) Providing one or more non-frozen concentrate components comprising any remaining ingredients, wherein one or more of the concentrate components is optionally aerated, wherein the temperature of the one or more concentrate components is independently no higher than 10, preferably 5 degrees centigrade;
(c) Mixing the ice and/or frozen fruit and/or frozen vegetable particles provided in step (a) with the one or more of the non-frozen concentrate components provided in step (b);
(d) Optionally hardening the mixture of step (c) by cooling it to a temperature of −15 to −25 degrees centigrade;
thereby to form the frozen confection,
wherein the ice and/or frozen fruit and/or frozen vegetable particles are selected from the group consisting of:
(a) A size distribution of number average length 1-500, preferably 5-200, most preferably 10-100 microns;
(b) A size distribution of number average length 100-3000, preferably 250-3000, most preferably 500-3000 microns;
(c) A size distribution with a number average length 500-5000, preferably 750-5000, most preferably 1000-5000 microns, and
(d) A size distribution of the combination of the distributions of (a) and (c).

By "first fat" is meant a fat component that an ingredient of the frozen confection itself, as opposed to the second fat which may be used to coat the frozen particles. When present, the first fat is preferably selected from the group consisting of butter fat, cocoa butter, coconut oil, palm oil, palm kernel oil and mixtures thereof. However the frozen confection is optionally substantially free of, preferably free of first fat.

By "freezing point depressant" is meant a solute that can be added to a solvent to decrease the freezing point of the solvent. The freezing point depressant is preferably selected from the group consisting of monosaccharides such as dextrose, fructose and galactose, disaccharides such as sucrose and lactose, starch hydrolysates such as corn syrup and maltodextrins (dextrose equivalent <20), soluble fibre such as inulin, fructooligosaccharide and polydextrose, polyols such as erythritol, arabitol, xylitol, sorbitol, mannitol, lactitol, maltitol, cellobiitol and glycerol, amino acids and mixtures thereof.

By "aerating agent" is meant an ingredient capable of maintaining the presence and/or structure of air cells in the frozen confection product during manufacture and/or during storage. When present, the aerating agent is preferably selected from the group consisting of water-soluble sucrose esters, hydrophobins, milk proteins, and mixtures thereof.

The stabilising particles preferably consist of or comprise hydrophobically surface modified silica, hydrophobically surface modified titanium dioxide, lycopodium powder, and a second fat which has solids content at 5 degrees centigrade of at least 10, preferably 40, most preferably 60% w/w, and a solids content at 30 degrees centigrade of no more than 60, preferably 40, most preferably 20% w/w.

The second fat is preferably selected from the group consisting of butter fat, cocoa butter, coconut oil, palm oil, palm kernel oil and mixtures thereof.

In a preferred embodiment, the stabilising particles are prepared from coconut oil or palm oil subject to supercritical melt micronization.

In one embodiment, step (a) provides ice particles at least partially coated with stabilising particles. In another embodiment, step (a) provides frozen fruit particles at least partially coated with stabilising particles. In yet another embodiment, step (a) provides frozen vegetable particles at least partially coated with stabilising particles.

The frozen confection can have an overrun of at most 400, preferably at most 300, most preferably at most 200% v/v. Optionally, the frozen confection has an overrun of no more than 25, preferably 20, most preferably 15%.

The frozen confection is optionally substantially free of, preferably free of emulsifier.

In a further aspect of the invention, a frozen confection produced according to the method of the first aspect of the invention is provided.

In another aspect of the invention, a frozen confection comprising ice and/or frozen fruit and/or frozen vegetable particles at least partially coated with the stabilising particles is provided.

In a final aspect of the invention, a kit for producing a frozen confection according to the second aspect of the invention is provided, the kit comprising:
(a) Ice and/or frozen fruit and/or frozen vegetable particles at least partially coated with stabilising particles; and
(b) One or more non-frozen concentrate components comprising any remaining ingredients, wherein one or more of the concentrate components is optionally aerated, wherein the temperature of the one or more concentrate components is no higher than 10, preferably 5 degrees centigrade.

Example 1

Preparation of Stabilised Water Droplets or Ice Particles

Stabilised water droplets were prepared by weighing water into the bowl of a Breville kitchen blender/liquidizer and adding the stabilizing particle in the form of a powder onto the liquid surface. The lid of the blender was then sealed with a clear film to prevent spillage of the fine powder and the blender was operated in bursts of 5 seconds five times on full power to prepare, if successful a free flowing powder with no residual water remaining at the bottom of the bowl.

To prepare the stabilised ice particles, the stabilised water droplets were frozen in a freezer at −20 to −25° C. for 12 to 24 hours. If after gentle loosening with a fork a fine free flowing ice powder was obtained then the experiment was considered successful.

In an alternative method for preparing stabilised ice particles, a steel cup was pre-cooled by filling it with 20 g of dry ice (solid CO2) pellets and leaving for 5 minutes. Ice was then added and layered with 10 g of dry ice. The ice was then broken down to a fine and fairly homogenous powder using a kitchen blender. The stabilising particles in the form of a powder were added and blended into the ice and a successful result resulted in a fine flowable ice powder. Alternatively if the ice is already finely powdered, then further blending with the stabilising particles is not needed as they can simply be gently mixed in.

Table 1 summarises the results of the stabilised water droplets or ice particles preparations using different stabilising particles. A tick in the column labelled "water" indicates that stabilised water droplets were produced and an "X" indicates that stabilised water droplets were not produced. A tick in the column labelled "ice" indicates that stabilised ice particles were produced using the alternative method described above, ie by crushing ice, and an "X" indicates that stabilised ice particles were not produced using the alternative method described above, ie by crushing ice.

Table 1: The results of the stabilised water droplets or ice particles preparations using different stabilising particles. A tick in the column labelled "water" indicates that stabilised water droplets were produced and an "X" indicates that stabilised water droplets were not produced. A tick in the column labelled "ice" indicates that stabilised ice particles were produced. A tick in the column labelled "ice" indicates that stabilised ice particles were produced using the alternative method described above, ie by crushing ice.

| Particle | % w/w | Manufacturer | Grade | Comments on grade | Ice | Water |
| --- | --- | --- | --- | --- | --- | --- |
| Hydrophobic silica | 5 | Evonik-Degussa | Sipenat D10 | Polydimethylsiloxane/4.5-8 microns | ✓ | ✓ |
| | 5 | Evonik-Degussa | Aerosil R 202 | Polydimethylsiloxane/14 nm | ✓ | ✓ |
| | 5 | Evonik-Degussa | Aerosil R 711 | Methacrylated | | X |
| | 5 | Huber Engineered Material | Zeoflo TL | Polydimethylsiloxane/4 microns | ✓ | ✓ |
| | 5 | Dow Corning | VM-2270 | 5-15 microns | ✓ | ✓ |
| | | Cabot | Cab-O-Sil TS 530 | Hexamethyldisloxane/150-200 nm | ✓ | ✓ |
| | 5 | Cabot | Cab-O-Sil TS 720 | Polydimethylsiloxane/16 nm | ✓ | ✓ |
| | 5 | Wacker | HDK H18 | | ✓ | ✓ |
| | | | | Polydimethylsiloxane/400 nm | | X |
| Hydrophobic silica | 1 | Evonik-Degussa | Sipenat D10 | Polydimethylsiloxane/4.5-8 microns | | X |
| | 2 | Evonik-Degussa | Sipenat D10 | Polydimethylsiloxane/4.5-8 microns | | ✓ |

-continued

| Particle | % w/w | Manufacturer | Grade | Comments on grade | Ice | Water |
|---|---|---|---|---|---|---|
| Hydrophilic silica | 5 | Evonik-Degussa | Sipenat 22S | Similar particle size to Sipenat D10 | X | X |
| Micronised fat (supercritical melt micronisation (ScMM)*) | 5 | — | ES48** | Hardstock fat blend | ✓/*** | X |
|  | 10 | — | ES48 |  |  | X |
|  | 5 | — | Palm oil |  | ✓** |  |
|  | 10 | — | Coconut oil |  | ✓** |  |
| Micronised wax | 5 | Deurex | Deurex MC6015 |  | ✓ | X |
|  | 10 | Beindorff | Carnauba |  |  | X |
| Milled wax | 10 | Oakland | Carnauba |  |  | X |
| Spray dried wax | 10 | Oakland | Carnauba |  |  | X |
| *Lycopodium* | 5 | Sigma-Aldrich |  |  | ✓ | X |
| Hydrophobic titania | 10 | Tayaca | MT-01 | Al, stearic acid/10 nm |  | X |
|  | 10 | Tayaca | MT-10EX | AL, isostearic acid/10 nm |  | X |
|  | 10 | Tayaca | MT-100TV | Al, stearic acid/15 nm |  | X |
|  | 10 | Tayaca | MT-100Z | Al, stearic acid 15 nm |  | ✓ |
|  | 10 | Tayaca | MT-150EX | AL, isostearic acid/15 nm |  | ✓ |
|  | 10 | Tayaca | MT-500SAS | Al, Si, silicone oil/30 nm |  | X |
|  | 10 | Tayaca | MTY-700BS | Silicone oil/80 nm |  | X |
|  | 10 | Tayaca | MT-700Z |  |  | X |
| Hydrophobic calcium carbonate | 10 | Solvay |  | Octanoic acid |  | X |

*ScMM is an abbreviation for supercritical melt micronization, also known as particles from gas saturated solution (PGSS). The process is described in WO 2005/014158 (see in particular pages 9 (line 2) to 11 (line 22) and the examples), P Munuklu, PhD thesis, Delft University of technology, 16 Dec. 2005 (see in particular chapter 4, pages 41-51), WO 2010/069746 (see in particular page 10 (line 20) to 11 (line 4) and the examples), and WO 2010/069750 (see in particular page 10 (lines 6-19) and the examples).
**A fine flowable ice powder was obtained that was still flowable after a storage period of 3 months at −25° C. in after gentle brake up of the partially sintered surface by hand.
***The stabilised ice particles were stable to storage at −3° C. for 4 days.
****Inter-esterified fat blend of palm oil stearine fraction and palm kernel stearine fraction.

Example 2

Preparation of Fruit Milk Ice Based on Stabilised Ice Particles Comprising 5% w/w Coconut Oil Stabilised ice particles comprising 5% w/w coconut oil and 95% w/w ice was stored in a freezer for 24 hours to allow for full evaporation of any surplus dry ice. Meanwhile 200 g emulsion concentrate was prepared by mixing 63 g sucrose, 31.8 g whey protein, 19.2 g maltodextrin MD40, 13.4 g coconut oil, 10.2 g skimmed milk powder, 1.4 g locust bean gum, 1.2 g citric acid and 1 g of raspberry flavour with 55.6 g boiling water. This mixture was then emulsified using a high speed mixer. The emulsion concentrate was then cooled to 5° C. and the final product prepared by adding 8 parts by weight of the emulsion concentrate to 12 parts by weight of stabilised ice particles and mixed quickly with a fork to obtain a homogenous fruit milk ice. The product had a good flavour and overall texture.

Example 3

Preparation of Fruit Milk Ice Based on Stabilised Ice Particles Comprising 5% w/w Palm Oil Stabilised ice particles comprising 5% w/w palm oil and 95% w/w ice was stored in a freezer for 24 hours to allow for full evaporation of any surplus dry ice. Meanwhile 200 g emulsion concentrate was prepared by mixing 63 g sucrose, 31.8 g whey protein, 19.2 g maltodextrin MD40, 13.4 g coconut oil, 10.2 g skimmed milk powder, 1.4 g locust bean gum, 1.2 g citric acid and 1 g of raspberry flavour with 55.6 g boiling water. This mixture was then emulsified using a high speed mixer. The emulsion concentrate was then cooled to 5° C. and the final product prepared by adding 8 parts by weight of the emulsion concentrate to 12 parts by weight of stabilised ice particles and mixed quickly with a fork to obtain a homogenous fruit milk ice. The product had a good flavour and overall texture.

Example 4

Preparation of an Ice Cream from Two Components Based on Stabilised Ice Particles Comprising 5% w/w Coconut Oil Stabilised ice particles comprising 5% w/w coconut oil and 95% w/w ice was stored in a freezer for 24 hours to allow for full evaporation of any surplus dry ice. Meanwhile 200 g of aerated concentrate was prepared by mixing 57 g sucrose, 44 g skimmed milk powder, 17 g maltodextrin MD40 and 0.6 g locust bean gum with 67 g of boiling water. This mixture was then well dispersed using a high speed mixer. After cooling to 5° C. overnight, the mixture was aerated with a whisk to an overrun of 130%. 10 parts by weight of the aerated concentrate was then added to 10 parts by weight of the stabilised ice particles and mixed with a fork to obtain a smooth ice cream with 50% overrun that had a good and light mouth feel.

Example 5

Preparation of an Ice Cream from Two Components Based on Stabilised Ice Particles Comprising 5% w/w Coconut Oil Stabilised ice particles comprising 5% w/w coconut oil and 95% w/w ice was stored in a freezer for 24 hours to allow for full evaporation of any surplus dry ice. Meanwhile 200 g of aerated emulsion concentrate was prepared by mixing 57 g sucrose, 44 g skimmed milk powder, 17 g maltodextrin MD40, 14.2 g coconut oil, 1.2 g of mono-diglyceride emulsifier HP60 and 0.6 g locust bean gum with 67 g of boiling water. This mixture was then emulsified using a high speed mixer. After cooling to 5° C. overnight to ensure full crystallisation of the fat droplets, the mixture was aerated with a whisk to an overrun of 130%. 10 parts by weight of this aerated emulsion concentrate was then added to 10 parts by weight of the stabilised ice particles and mixed with a fork to obtain a smooth ice cream with 55% overrun that had good microstructure and good mouth feel.

Example 6

Preparation of an Ice Cream from Two Components Based on Stabilised Ice Particles Comprising 5% w/w Palm Oil Stabilised ice particles comprising 5% w/w palm oil and 95% w/w ice was stored in a freezer for 24 hours to allow for full evaporation of any surplus dry ice. Meanwhile 200 g of aerated emulsion concentrate was prepared by mixing 57 g sucrose, 44 g skimmed milk powder, 17 g maltodextrin MD40, 14.2 g coconut oil, 1.2 g of mono-diglyceride emulsifier HP60 and 0.6 g locust bean gum with 67 g of boiling water. This mixture was then emulsified using a high speed mixer. After cooling to 5° C. overnight to ensure full crystallisation of the fat droplets, the mixture was aerated with a whisk to an overrun of 130%. 10 parts by weight of this aerated emulsion concentrate was then added to 10 parts by weight of the stabilised ice particles and mixed with a fork to obtain a smooth ice cream with 55% overrun that had good microstructure and good mouth feel.

Example 7

Preparation of an Ice Cream from Three Components Based on Stabilised Ice Particles Comprising 5% w/w Coconut Oil Stabilised ice particles comprising 5% w/w coconut oil and 95% w/w ice was stored in a freezer for 24 hours to allow for full evaporation of any surplus dry ice. An aerated concentrate was prepared by dissolving 650 g sucrose and 10 g sucrose ester S-1670 (Ryoto, Mitsubishi-Kagaku foods) in 350 g of boiling water and mixing this for 20 minutes at 80° C. to allow the sucrose ester to dissolve completely. This mixture was chilled to 5° C. and aerated with a whisk to an overrun of 220% which was stable for at least a few days at chilled conditions. Additionally an emulsion concentrate was prepared by mixing 74 g skimmed milk powder, 29.6 g maltodextrin MD40, 25 g coconut oil, 2 g emulsifier HP60, 1.4 g raspberry flavour and 1 g locust bean gum, with 117 g of boiling water. This mixture was then emulsified using a high speed mixer. The three components were then combined in the quantities of 10 parts by weight stabilised ice particles, 4 parts by weight foam concentrate and 6 parts by weight emulsion concentrate and mixed with a fork to obtain a homogenous, smooth aerated ice cream that would hold its shape when formed with the fork.

Example 8

Preparation of Frozen Drink Comprising a Bimodal Distribution of Stabilised Ice Particles A concentrate was prepared by mixing 25 g (5%) of sucrose, 2.5 g (0.5%) of guar gum and 472.5 g skimmed milk at 70° C. The mixture was then quickly blended using a high speed mixer for 1 minute to ensure dispersion of the guar gum. After cooling the concentrate was stored at 5° C. until use.

The ice particles were obtained by using a KitchenAid mixer with the grain mill attachment (item no: 800544). The mixer was pre-cooled by milling dry ice pellets until its outside was frosted up. Then 190 g of ice from an ice machine was weight out and mixed with dry ice pellets and left too cool until the ice had a crunchy and brittle texture. This ice was then fed into the mill and ground to a fine powder at the finest or second finest setting of the mill or to a coarser powder at the coarse settings of the mill. After ice particles were collected in a pre-cooled plastic tub filled with 10 g of palm oil ScMM fat powder and gently mixed in with a fork. A very homogenous fine ice powder was obtained that was still flowable after a storage period of 3 months at −25° C. in plastic sample tubs after gentle break-up of the partially sintered surface by hand. The stabilised fine ice and course particles were combined as a 1:1 by weight mixture.

To make a frozen drink 10 g of the mixture of stabilised ice particles was then mixed into 15 g of the concentrate and served in pre-cooled cups.

Example 9

Preparation of Stabilised Strawberry Particles

Fresh strawberries were prepared by removing the green tops and cutting them into centimetre sized bits (halved or quartered depending on size before freezing them at −25° C. These frozen strawberry pieces were then further cooled on dry ice and milled into a bed of ScMM ES48 thereby to produce a reddish coloured free flowing powder that smelt and tasted strongly of strawberries comprising 5% w/w ScMM ES48. The stabilised strawberry particles remained unchanged for at least 4 weeks at −25° C.

Example 10

Preparation of Strawberry Based Frozen Confection

A concentrate was prepared by whipping 200 g of whipping cream with 50 g of sucrose. The resultant whipped cream was then mixed with an equal weight of the stabilised strawberry particles prepared in Example 9 to provide a self supporting frozen confection with an intense strawberry and creamy taste that was not overly sweet.

In conclusion, Examples 2 to 10 demonstrate that quality frozen confections may be manufactured without the use of factory scale equipment and apparatus. Moreover, all examples demonstrate that high quality aerated frozen confections may be produced if particles of ice or fruit are coated with stabilising particles having a hydrophobic surface are used.

The invention claimed is:

1. A method of manufacturing a frozen confection having 40 to 85 by weight water in liquid and frozen forms;
0 to 30%- by weight first fat; 5 to 45% by weight freezing point depressant; 0 to 7% by weight aerating agent selected from the group of water-soluble sucrose esters, hydrophobins, milk proteins, and mixtures thereof; and 0.5 to 10% by weight w/w stabilizing particles,
the frozen confection having an overrun of at least 10% by volume when comprising aerating agent, wherein the surface of the stabilizing particles is hydrophobic and wherein the stabilizing particles are selected from the group of hydrophobically surface modified silica, hydrophobically surface modified titanium dioxide and lycopodium powder, the stabilizing particles further comprising a coating fat which coats the stabilizing particles to produce coated stabilizing particles and which coating fat has solids content at 5 degrees centigrade of at least 10 weight percent, and a solids content at 30 degrees centigrade of no more than 60 weight percent, the method comprising the steps of:
(a) Providing ice or frozen fruit or frozen vegetable particles at least partially coated with the coated stabilizing particles;
(b) Providing one or more non-frozen concentrate components comprising any remaining ingredients, wherein one or more of the concentrate components is optionally aerated, wherein the temperature of the one or more concentrate components is independently no higher than 10 degrees centigrade;
(c) Mixing the ice or frozen fruit or frozen vegetable particles provided in step (a) with the one or more of the non-frozen concentrate components provided in step (b);
(d) Optionally hardening the mixture of step (c) by cooling it to a temperature of −15 to −25 degrees centigrade;
thereby to form the frozen confection,
wherein the particle size distribution of the ice or frozen fruit or frozen vegetable particles are selected from the group of:
(i) A particle size distribution of 1-500 microns;
(ii) A particle size distribution of 100-3000 microns;
(iii) A particle size distribution of 500-5000 microns; and
(iv) A particle size distribution of the combination of the particle size distributions of (i) and (iii).

2. A method according to claim 1, wherein the first fat is selected from the group consisting of butter fat, cocoa butter, coconut oil, palm oil, palm kernel oil and mixtures thereof.

3. A method according to claim 1, wherein the freezing point depressant is selected from the group of monosaccharides, disaccharides, starch hydrolysates, soluble fiber, polyols, amino acids and mixtures thereof.

4. A method according to claim 1, wherein the coating fat is selected from the group of butter fat, cocoa butter, coconut oil, palm oil, palm kernel oil and mixtures thereof.

5. A method according to claim 1, wherein the frozen confection has an overrun of at most 400% by volume.

6. A method according to claim 1, wherein the frozen confection is substantially free of emulsifier.

7. A method according to claim 1, wherein the frozen confection is substantially free of first fat.

8. A method according to claim 1, wherein the frozen confection has an overrun of no more than 25%.

* * * * *